US012767881B1

(12) United States Patent
Almubarak et al.

(10) Patent No.: US 12,767,881 B1
(45) Date of Patent: Oct. 20, 2026

(54) EMULSIFIERS FOR TREATMENT FLUIDS AND METHODS FOR USE OF TREATMENT FLUIDS IN SUBTERRANEAN FORMATIONS

(71) Applicant: SAUDI ARABIAN OIL COMPANY, Dhahran (SA)

(72) Inventors: Tariq Abdulsattar Almubarak, Dhahran (SA); Majid MohammadKamal Rafie, Dhahran (SA); Mohammed I. Alabdrabalnabi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/294,946

(22) Filed: Aug. 8, 2025

(51) Int. Cl.
*C09K 8/72* (2006.01)
*C09K 8/528* (2006.01)

(52) U.S. Cl.
CPC ................ *C09K 8/72* (2013.01); *C09K 8/528* (2013.01)

(58) Field of Classification Search
CPC ........................................................ C09K 8/60
See application file for complete search history.

(56) References Cited

U.S. PATENT DOCUMENTS

| | | | | |
|---|---|---|---|---|
| 2,721,174 | A | 10/1955 | Brainerd, Jr. | |
| 5,355,958 | A | 10/1994 | Pauls et al. | |
| 5,397,385 | A | 3/1995 | Watts | |
| 6,989,354 | B2 | 1/2006 | Thaemlitz et al. | |
| 8,735,427 | B2 | 5/2014 | Numata et al. | |
| 9,376,611 | B2 | 6/2016 | Berry et al. | |
| 10,519,327 | B2 | 12/2019 | Phillips | |
| 12,252,647 | B1 * | 3/2025 | Almubarak | C09K 8/60 |
| 2007/0244203 | A1 * | 10/2007 | Raul | A61K 47/30 514/770 |
| 2018/0221427 | A1 * | 8/2018 | Gabriele | A61K 36/81 |
| 2025/0351832 | A1 * | 11/2025 | Yadav | A01N 65/10 |

FOREIGN PATENT DOCUMENTS

| | | | |
|---|---|---|---|
| CN | 103081907 | A | 5/2013 |
| DE | 202024103739 | U1 | 7/2024 |

OTHER PUBLICATIONS

Akbas, E., Soyler, et al., Capsaicin emulsions: Formulation and characterization. Journal of Dispersion Science and Technology, (2016), 38(8), 1079-1086.

Nigam, Kuldeep et al., Nano-emulsion from Capsaicin: Formulation and Characterization, Materials Today: Proceedings, vol. 18, Part 3, 2019, pp. 869-878.

* cited by examiner

*Primary Examiner* — William D Hutton, Jr.
*Assistant Examiner* — Avi T Skaist
(74) *Attorney, Agent, or Firm* — Vorys, Sater, Seymour and Pease LLP

(57) ABSTRACT

Treatment fluids may comprise: an emulsifier comprising a capsaicinoid comprising: a vanillyl moiety, an amide linkage, and a hydrophobic chain; an aqueous phase comprising an aqueous fluid and a treatment agent; and an oil phase comprising an oil. Methods of using the treatment fluids may include providing treatment fluids and introducing the treatment fluids into a subterranean formation.

15 Claims, No Drawings

EMULSIFIERS FOR TREATMENT FLUIDS AND METHODS FOR USE OF TREATMENT FLUIDS IN SUBTERRANEAN FORMATIONS

FIELD OF THE DISCLOSURE

The present disclosure generally relates to nontoxic emulsifiers, and more specifically, capsaicinoid emulsifiers used in water-in-oil (W/O) emulsions.

BACKGROUND OF THE DISCLOSURE

Emulsifiers are widely used in oilfield treatments to facilitate the stable mixing of immiscible fluids, particularly in acidizing systems where aqueous acids are delivered in a controlled fashion through an oleaginous continuous phase. In many such applications, these emulsions are formed with acids or chelating agents as the aqueous phase, and a hydrocarbon such as diesel as the oil phase. Emulsifiers aid to form and stabilize these emulsions. These emulsions are applied in subterranean formation operations such as matrix acidizing, acid fracturing, mud filtercake removal, and inorganic scale removal. The emulsion form offers several advantages: it slows the acid-rock reaction rate, mitigates corrosion of downhole equipment, and promotes deeper penetration by enhancing wormhole formation. The stability and performance of the emulsion depends on the emulsifier's ability to tolerate high temperatures, high salinity, and shear forces during pumping and injection.

Conventional emulsifiers used in these systems are not environmentally friendly and are often toxic. Example conventional emulsifiers may include quaternary ammonium salts or ethoxylated nonionic surfactants. While effective in stabilizing emulsions, conventional emulsifiers tend to exhibit poor biodegradability and may be toxic, raising regulatory concerns, especially in offshore and environmentally sensitive operations. Moreover, many exhibit limited thermal and/or salt tolerance, reducing their reliability under harsh downhole conditions.

To address these challenges, various "green" or bio-based emulsifiers have been proposed. However, many of these alternatives still present toxicity concerns, and those that are nontoxic often fall short of the performance requirements needed for subterranean formation operations. In particular, they may lack the emulsion stability, acid compatibility, or robustness to remain effective under the high-temperature, high-pressure, high-ionic-strength conditions typical of reservoir stimulation treatments. There remains an unmet need in the industry for emulsifiers that combine high-performance emulsion stability with low toxicity.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In various aspects, the present disclosure provides a method comprising: providing a treatment fluid comprising: an emulsifier comprising a capsaicinoid comprising: a vanillyl moiety, an amide linkage, and a hydrophobic chain; an aqueous phase comprising an aqueous fluid and a treatment agent; an oil phase comprising an oil; and introducing the treatment fluid into a subterranean formation.

In various aspects, the present disclosure provides a treatment fluid comprising: an emulsifier comprising a capsaicinoid comprising: a vanillyl moiety, an amide linkage, and a hydrophobic chain; an aqueous phase comprising an aqueous fluid and a treatment agent; and an oil phase comprising an oil.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

The present disclosure generally relates to nontoxic emulsifiers, and more specifically, capsaicinoid emulsifiers used in W/O emulsions.

As discussed above, conventional emulsifiers often suffer from significant drawbacks, including toxicity, poor biodegradability, limited thermal stability, and inadequate performance, especially in high-salinity or high-temperature environments commonly encountered during subterranean formation operations.

The present disclosure demonstrates that surprisingly, capsaicinoids may function as superior emulsifiers for treatment fluids that are W/O emulsions, where the aqueous phase comprises aqueous fluids (e.g., water) and treatment agents comprising acids and/or chelating agents and the oil phase comprises an oil. The term "W/O emulsion," and grammatical variants thereof, refers to a two-phase system in which discrete droplets of the aqueous phase are distributed in the continuous oil phase. The capsaicinoids may be derived from *Capsicum* plant species, and may function as green, nontoxic emulsifiers for strong acids, such as, hydrochloric acid. With regards to toxicity, capsaicinoids (natural and synthetic) are advantageous as they are ranked as Generally Recognized as Safe (GRAS) by the United States Federal Drug Administration (FDA).

The capsaicinoids may be present in treatment fluids in low amounts and still effectively stabilize and maintain the treatment fluids as emulsions, especially at high temperatures and/or high pressures and high acid concentrations.

Compositions of the present disclosure may comprise: a treatment fluid comprising: an emulsifier comprising a capsaicinoid comprising: a vanillyl moiety, an amide linkage, and a hydrophobic chain; an aqueous phase comprising an aqueous fluid and a treatment agent; and an oil phase comprising an oil. The term "treatment fluid," and grammatical variants thereof, refers to any fluid that may be used in a subterranean formation operation (also referred to as an "operation" herein) in conjunction with a desired function and/or for a desired purpose. In some aspects, the treatment fluids may be used in methods comprising providing treatment fluids of this disclosure and introducing the treatment fluids into a subterranean formation.

As used herein, the term "subterranean formation," and grammatical variants thereof, refers to naturally occurring rock beneath the Earth's surface, including subsea surfaces. Subterranean formations may be formed from a variety of natural rock including, but not limited to, carbonate-based rock (e.g., calcium carbonate ($CaCO_3$)), calcium magnesium carbonate ($CaMg(CO_3)_2$) (also referred to as dolomite), sandstone-based rock comprising clays (e.g., smectite, illite, kaolinite, chlorite, and the like), each of which include minerals (e.g., siliceous material) the like, and any combination thereof. The subterranean formations described herein may encompass reservoir zones (i.e., zones comprising hydrocarbons) and non-reservoir zones (i.e., zones that do not include hydrocarbons, such as, water-producing zones).

Suitable emulsifiers for the treatment fluids may include alkylamides, alkaloids, capsaicinoids, the like, derivatives thereof, and combinations thereof. As used herein, the term "alkylamide" and grammatical variants thereof, refers to an amide functional group linked to an alkyl chain where the amino group is bonded to an aryl, heteroaryl, or alkyl substituent.

Suitable capsaicinoids may include compounds having a structure represented by Formula 1 below, Formula 1

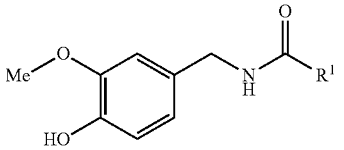

wherein $R^1$ may be an alkyl, heteroalkyl, aryl, heteroaryl, a straight-chain alkyl, alkoxy or thioalkyl group having 1 to 20 atoms, or combinations thereof. Suitable capsaicinoids may include compounds comprising a vanillyl moiety, an amide, and a hydrophobic chain. The vanillyl moiety may be a 4-hydroxy-3-methoxyphenyl group. The amide may be an amide linkage, as used herein, the term "amide linkage," and grammatical variants thereof, refers to an amide that directly joins the vanillyl moiety to the hydrophobic chain. An example of a molecule comprising an amide linkage is capsaicin. Without intending to be bound by theory, the vanillyl moiety and the amide linkage combined with the hydrophobic chain may lead to improved emulsification performance compared to other alkylamides and/or alkylamines. The hydrophobic chains of the capsaicinoids may be a length of 3 atoms to 50 atoms, including all values and subsets in between, such as, 3 atoms to about 20 atoms. The atoms may be carbon or heteroatoms, such as, such as O, N, S, P, halogens, or combinations thereof. The hydrophobic chains may include saturated olefinic and/or acetylenic bonds and may be linear or branched. Branching may occur at one or more carbon atoms along the hydrophobic chain or at along a branch itself (that is, secondary or higher-order branching). The branches may be positioned at internal or terminal carbons of the hydrophobic chain or a branch. Branching substituents may include $C_1$-$C_8$ alkyl substituents, such as, methyl, ethyl, isopropyl, sec-butyl, tert-butyl, or 2-ethylhexyl groups, the like, and substituents containing heteroatoms, such as O, N, S, P, halogens, or combinations thereof.

Suitable emulsifiers may include capsaicinoids derived from *capsicum* plant species, such as, bell peppers, cayenne peppers, ghost peppers, Carolina reaper peppers, jalapeno peppers, the like, or combinations thereof. Suitable emulsifiers may include effluent from manufacturing operations that processes *capsicum* plant species. The effluent from manufacturing operations that processes *capsicum* plant species may include capsaicinoids, and this effluent may be used to form the treatment fluids discussed herein or may be used to source the emulsifiers for the treatment fluids discussed herein.

Example capsaicinoids derived from *capsicum* plant species include capsaicin, dihydrocapsaicin, homocapsaicin, homodihydrocapsaicin, norcapsaicin, nordihydrocapsaicin, and the like. Suitable emulsifiers may include synthetic capsaicinoids, such as, synthetic analogues of capsaicin, capsaicin derivatives, nonivamide, aravanil, olvanil, phenylacetylrinvanil, the like, and combinations thereof.

The emulsifiers may not include toxic emulsifiers. Example toxic emulsifiers may include alkylphenol ethoxylates, ethoxylated octylphenol, nonylphenol, petroleum sulfonates, quaternary ammonium compounds, cocamide diethanolamine, the like, and combinations thereof.

The emulsifiers may be present in the treatment fluids at a concentration of about 0.01 wt % to about 30 wt %, based on the weight of the treatment fluid, including all values and subsets in between, such as, about 0.1 wt % to about 10 wt % or about 0.1 wt % to about 3 wt %.

The treatment fluids of this disclosure may include an aqueous phase comprising an aqueous fluid and a treatment agent. Suitable aqueous fluids for the aqueous phase may include water (e.g., stream water, lake water, or municipal treated water), non-potable water, such as, gray water or industrial process water, sea water, brine, aqueous salt solutions, partially desalinated water, produced water (including brine and other salt water solutions), the like, or any combination thereof.

Suitable treatment agents for the aqueous phase include acids, such as, strong acids, mineral acids, weak acids, organic acids, the like, and combinations thereof, and chelating agents.

Suitable acids may include strong acids, such as, hydrochloric acid, hydrobromic acid, nitric acid, sulfuric acid, chloric acid, perchloric acid, the like, or combinations thereof. Suitable weak acids may include formic acid, acetic acid, citric acid, propionic acid, methanesulfonic acid, chloroacetic acid (e.g., mono-chloroacetic acid, dichloroacetic acid, and trichloroacetic acid), trifluoroacetic acid, the like, or combinations thereof. Suitable weak acids may include acids with a $pK_a$ greater than 0. Suitable acids may include acids that can generate a pH of two or lower when present in the aqueous phase in a suitable amount.

The acid may be present in the aqueous phase at a concentration of about 0.1 wt % to about 45 wt %, by weight of the aqueous phase, including all values and subsets in between, such as, about 0.5 wt % to about 25 wt %, about 0.5 wt % to about 28 wt %, about 0.5 wt % to about 15 wt %, about 2 wt % to about 25 wt %, about 5 wt % to about 25 wt %, about 5 wt % to about 15 wt %, or about 15 wt %.

Suitable chelating agents may include polyfunctional ligand compounds capable of forming two or more coordinate bonds with a metal ion. Suitable chelating agents may include acid chelating agents, salt chelating agents, aminopolycarboxylic acids, hydroxycarboxylic acids, organic acids (e.g., citric or oxalic acid), phosphonic acids, polyphosphonic acids, organophosphonic acids, crown ethers, macrocycles (e.g., cylam and calixarenes), polyamines (e.g., triethylenetetramine), salts thereof (e.g., a phosphonate, a polyphosphonate, an organophosphonate), ethylenediaminetetraacetic (EDTA), tetrasodium ethylenediaminetetraacetic acid ($Na_4$-EDTA), hydroxyethylenediaminetriacetic acid (HEDTA), diethylenetriaminepentaacetic acid (DTPA), L-glutamic-N,N-diacetic acid (GLDA), methylglycinediacetic acid (MGDA), nitrilotriacetic acid (NTA), hydroxyethyliminodiacetic acid (HEIDA), cyclohexylenediaminetetraacetic acid (CDTA), diphenylaminesulfonic acid (DPAS), ethylenediaminedi (o-hydroxyphenylacetic) acid (EDDHA), glucoheptonic acid, gluconic acid, citric acid, ethylenediamine-N,N'-disuccinic acid (EDDS), Tetraxetan (DOTA), salts thereof, the like, and any combination thereof.

The chelating agents may be present in the aqueous phase at a concentration of about 0.5 wt % to about 45 wt %, by weight of the aqueous phase, including all values and subsets in between, such as, about 0.5 wt % to about 25 wt %, about 1 wt % to about 25 wt % or about 15 wt %.

The treatment fluids may include 20 vol % to about 90 vol % aqueous phase, by volume of the treatment fluid, including all values and subsets in between, such as, about 30 vol % to about 80 vol % or about 40 vol % to about 50 vol %.

The treatment fluids of this disclosure may include an oil phase comprising an oil. Suitable oils include oils that can serve as a continuous phase for dispersed aqueous phases. Suitable oils may include hydrocarbons, petroleum, refined petroleum, diesel, mineral oils, natural gas, plant oils, vegetable oils, an oilfield fluid or a component thereof, the like, or combinations thereof.

The treatment fluids may include 80 vol % to about 10 vol % oil phase, by volume of the treatment fluid, including all values and subsets in between, such as, about 80 vol % to about 30 vol % or about 50 vol % to about 40 vol %.

In some aspects, suitable treatment fluid may have a ratio of aqueous phase to oil phase of about 95:5 to about 5:95, by volume, including all values and subsets in between, such as, about 90:10 to about 10:90, about 70:30 to about 30:70, or about 50:50.

The treatment fluids described herein may further include one or more additives suitable for achieving one or more desired functions, provided that the one or more additives do not adversely affect the function of treatment fluids described herein. Examples of suitable additives may include a salt, a weighting agent, an inert solid, a fluid loss control agent, additional emulsifiers, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a scale inhibitor, a gas hydrate inhibitor, a mutual solvent, an oxidizer, a reducer, a friction reducer, a clay stabilizing agent, an iron control agent, the like, or any combination thereof. Suitable examples of the foregoing will be familiar to one having ordinary skill in the art. Suitable additives may be present at any wt % in the treatment fluids.

The treatment fluid may be formed by mixing the foregoing components using known mixing equipment. In some aspects, the treatment fluids may be formed by adding the emulsifiers to an oil phase, subsequently adding an aqueous phase and optional additives to the oil phase, and mixing to form a W/O emulsion. The method of forming the treatment fluids may include the emulsifiers emulsifying the aqueous phase and the oil phase to form a W/O emulsion.

Prior to adding the emulsifiers to the oil phase, the emulsifiers may be dry or carried in a solvent. Emulsifiers carried in a solvent may be added to an oil phase in the same manner as described above. Suitable solvents to carry the emulsifiers include alcohols, ethanol, methanol, isopropyl alcohol, acetone, dichloromethane, acetic acid, DMSO (dimethyl sulfoxide), dimethyl formamide, acetonitrile, ethyl ether, petroleum ether, benzene, the like, and combinations thereof. The treatment fluids of this disclosure may have a conductivity of 0 Siemens(S)/m to about 3 S/m, including all values and subsets in between, such as, about 0 to about $10^{-6}$ S/m to about 0.1 S/m. Conductivity of treatment fluids may be determined by ASTM G205-23, ASTM D1125-14, the like, or other known methods.

The treatment fluids may be used in performing subterranean formation operations, such as, matrix acidizing operations, acid fracturing operations, mud filtercake removal operations, inorganic scale removal operations, and the like.

Matrix acidizing may include introducing the treatment fluid into the subterranean formation at pressures below the fracturing threshold. The treatment agent, such as acid, in the aqueous phase may selectively dissolve formation carbonate or sandstone minerals, thereby enlarging pore throats and improving permeability without creating new fractures. The oil phase may carry the aqueous phase deeper into low-permeability zones while minimizing corrosion to downhole tubulars. Acid fracturing may include introducing the treatment fluid at a pressure sufficient to fracture at least a portion of a subterranean formation to initiate and/or propagate fractures. The oil phase may transport the aqueous phase to tips of fractures and the acid of the aqueous phase may react to create wormhole channels in the subterranean formation. As used herein, the term “wormhole channel” and grammatical variants thereof, refers to a passage formed in a subterranean formation through which a hydrocarbon resource may flow. Performing a mud filtercake removal may include contacting a filtercake with the treatment fluid, wherein the oil phase at least partially dissolves oil-wet solids and the aqueous phase at least partially dissolves, disrupts, or disaggregates the filtercake. As used herein, the term “filtercake” and grammatical variants thereof, refers to a layer of solids deposited on a permeable medium (e.g., on a formation face or a filter press medium). Performing an inorganic scale removal operation may include contacting a scale with the treatment fluid, wherein the aqueous phase at least partially dissolves the inorganic scale mineral. As used herein, the term “inorganic scale” and grammatical variants thereof, refers to mineral deposits of inorganic salts (e.g., calcium carbonate, barium sulfate, strontium sulfate, iron sulfides, chlorites, or the like) that form on metal surfaces, tubulars, perforations, or within pore spaces during oil-field operations.

The treatment fluids may maintain emulsion stability at normal and/or high temperatures and/or pressures. The treatment fluids may be used in subterranean formations having a temperature of about 65° C. to about 180° C., including all values and subsets in between, such as, about 100° C. to about 180° C. or about 120° C. to about 160° C. The treatment fluids may be used in subterranean formations having a closure pressure of about 60 MPa to about 100 MPa, including all values and subsets in between, such as, about 70 MPa to about 90 MPa.

Systems for introduction of treatment fluids to a wellbore in conjunction with a subterranean formation operation may comprise a pump fluidly coupled to a tubing, the tubing located at least partially within the wellbore and the tubing containing a treatment fluid for a desired stimulation operation. The “pump” described herein may comprise a single pump or may comprise one or more pumps which may include “high pressure” and “low pressure” pump(s) in any combination. A “high pressure” pump, i.e., a pump operating at a pressure greater than about 1000 psi, may be used in subterranean formation operations according to the present disclosure, such as acid fracturing, where fracturing of the subterranean formation at a pressure higher than the fracture gradient pressure is required. A “low pressure” pump, i.e., a pump operating at a pressure of about 1000 psi or less, may be used in stimulation operations such as matrix acidizing where lower pressures are needed and where fracturing of the subterranean formation is not required. Given the benefit of the present disclosure, one having ordinary skill in the art will be able to select an appropriate pump or combination of pumps for a given stimulation operation.

The treatment fluids of the present disclosure may be injected using the pump(s) into the subterranean formation using the tubing located within the wellbore. The treatment fluid used in a particular subterranean formation operation may flow downhole through the tubing and flow out of the tubing into the subterranean formation in order to carry out the subterranean formation operation. Subsequently, in some subterranean formation operations including matrix acidizing and acid fracturing, the treatment fluid of a particular subterranean formation operation may be flowed back to the wellhead along with residual components which may include, for example, the acid-soluble material dissolved from the formation matrix during an acidizing operation. The treatment fluid and residual components may flow through the tubing or the wellbore annulus and back to the wellhead.

It should be noted that additional nonlimiting components may be present in systems suitable to introduce the treatment fluids to a subterranean formation and to recover fluid from the subterranean formation following a subterranean formation operation. Such additional components will be familiar to one having ordinary skill in the art and include, but are not limited to, supply hoppers, valves, condensers, adapters, joints, gauges, sensors, compressors, pressure controllers, pressure sensors, flow rate controllers, flow rate sensors, temperature sensors, the like, or any combination thereof.

It is also to be recognized that the disclosed treatment fluids may or may not affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices, or components, the like, or any combination thereof.

The present disclosure is further directed to the following non-limiting clauses:

Clause 1. A method comprising: providing a treatment fluid comprising: an emulsifier comprising a capsaicinoid comprising: a vanillyl moiety, an amide linkage, and a hydrophobic chain; an aqueous phase comprising an aqueous fluid and a treatment agent; an oil phase comprising an oil; and introducing the treatment fluid into a subterranean formation.

Clause 2. The method of clause 1, wherein the treatment fluid is a water-in-oil (W/O) emulsion.

Clause 3. The method of clauses 1 or 2, wherein the treatment agent is a strong acid, weak acid, a chelating agent, or combinations thereof.

Clause 4. The method of any of clauses 1-3, wherein the strong acid is selected from the group consisting of hydrochloric acid, hydrobromic acid, nitric acid, sulfuric acid, chloric acid, perchloric acid, or combinations thereof.

Clause 5. The method of any of clauses 1-4, wherein the strong acid is present in the aqueous phase at a concentration of about 5 wt % to about 28 wt %, by weight of the aqueous phase.

Clause 6. The method of any of clauses 1-5, wherein the capsaicinoid is compound derived from members selected from the group consisting of bell peppers, cayenne peppers, ghost peppers, Carolina reaper peppers, jalapeno peppers, and combinations thereof.

Clause 7. The method of any of clauses 1-6, wherein the emulsifier is selected from the group consisting of capsaicin, dihydrocapsaicin, homocapsaicin, homodihydrocapsaicin, norcapsaicin, nordihydrocapsaicin, and combinations thereof.

Clause 8. The method of any of clauses 1-7, wherein the emulsifier is selected from the group consisting of nonivamide, aravanil, olvanil, phenylacetylrinvanil, and combinations thereof.

Clause 9. The method of any of clauses 1-8, wherein the treatment agent comprises a weak acid or a chelating agent.

Clause 10. The method of any of clauses 1-9, wherein the weak acid is present in the aqueous phase at a concentration of about 0.5 wt % to about 15 wt %, by weight of the aqueous phase.

Clause 11. The method of any of clauses 1-10, wherein the chelating agent is present in the aqueous phase at a concentration of about 1 wt % to about 25 wt %, by weight of the aqueous phase.

Clause 12. The method of any of clauses 1-11, wherein the emulsifier is present in the treatment fluid at a concentration of about 0.1 wt % to about 3 wt %.

Clause 13. The method of any of clauses 1-12, wherein the emulsifier is present in the treatment fluid at a concentration of about 1 wt % to about 3 wt % and the treatment fluid has a conductivity of about 0 (S/m).

Clause 14. The method of any of clauses 1-13, further comprising performing a matrix acidizing operation, acid fracturing operation, mud filtercake removal operation, or inorganic scale removal operation.

Clause 15. The method of any of clauses 1-14, wherein the treatment fluid is introduced into a subterranean formation having a temperature of about 120° C. to about 160° C.

Clause 16. A treatment fluid comprising: an emulsifier comprising a capsaicinoid comprising: a vanillyl moiety, an amide linkage, and a hydrophobic chain; an aqueous phase comprising an aqueous fluid and a treatment agent; and an oil phase comprising an oil.

Clause 17. The composition of clause 16, wherein the treatment fluid is a W/O emulsion.

Clause 18. The composition of clauses 16 or 17, wherein the treatment agent is a strong acid, weak acid, a chelating agent, or combinations thereof.

Clause 19. The composition of any of clauses 16-18, wherein the capsaicinoid is compound derived from members selected from the group consisting of bell peppers, cayenne peppers, ghost peppers, Carolina reaper peppers, jalapeno peppers, and combinations thereof.

Clause 20. The composition of any of clauses 16-19, wherein the emulsifier is selected from the group consisting of capsaicin, dihydrocapsaicin, homocapsaicin, homodihydrocapsaicin, norcapsaicin, and nordihydrocapsaicin.

Clause 21: A method of forming a treatment fluid comprising: adding an emulsifier of any of the previous clauses to an oil of any of the previous clauses; adding an aqueous acid of any of the previous clauses and optionally additives to the oil; and mixing, wherein in some aspects, a W/O emulsion is formed.

To facilitate a better understanding of the disclosure herein, the following examples of various representative embodiments are given. In no way should the following examples be read to limit, or to define, the scope of the invention.

EXAMPLES

Control Mixture. A control mixture was prepared by adding 10 ml 15 wt % hydrochloric acid, by weight of the hydrochloric acid solution, to 10 ml of diesel in a glass and shaking the glass. The control mixture immediately emulsified but after two minutes (min) the emulsion separated.

Inventive Mixture A. Inventive Mixture A comprised pure (99.99%) capsaicin crystals, diesel, and hydrochloric acid. Inventive Mixture A was prepared by adding 2 wt % of pure (99.99%) capsaicin crystals, by weight of Inventive Mixture A, to 6 ml of diesel in a glass and shaking it vigorously. Then 14 ml of 15 wt % hydrochloric acid, by weight of the hydrochloric acid solution, was added to the glass and the glass was shaken. An emulsion formed and after 10 min the emulsion was still stable. A conductivity test was performed on Inventive Mixture A and showed a conductivity of about 0 (S/m), showing that the oil formed a continuous external phase insulating the hydrochloric acid. The conductivity for Inventive Mixtures A and B were measured using a Thermo Scientific Orion Versastar benchtop meter (available from Thermo Scientific, Massachusetts, U.S.)

A drop test was conducted in water to confirm that the diesel was the outer phase. Inventive Mixture A was dropped into water using a syringe and formed droplets in the water. The droplets sank to the bottom of the glass.

Inventive Mixture B. Inventive Mixture B comprised pure (99.99%) nonivamide crystals, diesel, and hydrochloric acid. Inventive Mixture B was prepared by adding 2 wt % of pure (99.99%) nonivamide crystals, by weight of Inventive Mixture B, to 6 ml of diesel in a glass and shaking it vigorously. Then 14 ml of 15 wt % hydrochloric acid, by weight of the hydrochloric acid solution, was added to the glass and the glass was shaken. An emulsion formed and after 10 min the emulsion was still stable. A conductivity test was performed on Inventive Mixture B and showed a conductivity of about 0 (S/m), showing that the oil forms a continuous external phase insulating the hydrochloric acid. A drop test was conducted in water to confirm that the diesel was the outer phase. Inventive Mixture B was dropped into water using a syringe and formed droplets in the water. The droplets sank to the bottom of the glass.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached"

or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system, or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is the following:

1. A method comprising:

providing a treatment fluid comprising:

an emulsifier comprising a capsaicinoid comprising: a vanillyl moiety, an amide linkage, and a hydrophobic chain;

an aqueous phase comprising an aqueous fluid and a treatment agent;

an oil phase comprising an oil; and introducing the treatment fluid into a subterranean formation.

2. The method of claim 1, wherein the treatment fluid is a water-in-oil (W/O) emulsion.

3. The method of claim 1, wherein the treatment agent is a strong acid, weak acid, a chelating agent, or combinations thereof.

4. The method of claim 3, wherein the strong acid is selected from the group consisting of hydrochloric acid, hydrobromic acid, nitric acid, sulfuric acid, chloric acid, perchloric acid, or combinations thereof.

5. The method of claim 3, wherein the strong acid is present in the aqueous phase at a concentration of about 5 wt % to about 28 wt %, by weight of the aqueous phase.

6. The method of claim 1, wherein the capsaicinoid is a compound derived from members selected from the group consisting of bell peppers, cayenne peppers, ghost peppers, Carolina reaper peppers, jalapeno peppers, and combinations thereof.

7. The method of claim 1, wherein the emulsifier is selected from the group consisting of capsaicin, dihydrocapsaicin, homocapsaicin, homodihydrocapsaicin, norcapsaicin, nordihydrocapsaicin, and combinations thereof.

8. The method of claim 1, wherein the emulsifier is selected from the group consisting of nonivamide, aravanil, olvanil, phenylacetylrinvanil, and combinations thereof.

9. The method of claim 1, wherein the treatment agent comprises a weak acid or a chelating agent.

10. The method of claim 9, wherein the weak acid is present in the aqueous phase at a concentration of about 0.5 wt % to about 15 wt %, by weight of the aqueous phase.

11. The method of claim 9, wherein the chelating agent is present in the aqueous phase at a concentration of about 1 wt % to about 25 wt %, by weight of the aqueous phase.

12. The method of claim 2, wherein the emulsifier is present in the treatment fluid at a concentration of about 0.1 wt % to about 3 wt %.

13. The method of claim 7, wherein the emulsifier is present in the treatment fluid at a concentration of about 1 wt % to about 3 wt % and the treatment fluid has a conductivity of about 0 (S/m).

14. The method of claim 2, further comprising performing a matrix acidizing operation, acid fracturing operation, mud filtercake removal operation, or inorganic scale removal operation.

15. The method of claim 14, wherein the treatment fluid is introduced into a subterranean formation having a temperature of about 120° C. to about 160° C.

* * * * *